United States Patent [19]
Fujihara

[11] 3,839,134
[45] Oct. 1, 1974

[54] ELECTRIC HEAT-GENERATING SHEET ASSEMBLY

[75] Inventor: Katsuji Fujihara, Osaka, Japan
[73] Assignee: Kansai Hoon Kogyo Kabushiki Kaisha, Osaka, Japan
[22] Filed: Feb. 5, 1973
[21] Appl. No.: 329,416

[30] Foreign Application Priority Data
Feb. 9, 1972  Japan.............................. 47-15876

[52] U.S. Cl.................................. 161/62, 161/113
[51] Int. Cl.......................... B32b 1/04, B32b 3/02
[58] Field of Search............................. 161/62, 113

[56] References Cited
UNITED STATES PATENTS
3,657,516    4/1972    Fujihara............................ 219/311

Primary Examiner—William J. Van Balen
Attorney, Agent, or Firm—Wenderoth, Lind & Ponack

[57] ABSTRACT

An electric heat-generating sheet assembly comprising: a porous, paper-like electric heat-generating sheet member made of a web consisting of carbon fibers and non-meltable fibers and being impregnated with a thermoplastic material; at least one pair of electrodes arranged, in spaced relation from each other, on said sheet member in contact with its surface; polyester films sandwiching the combination of said electrodes and said sheet member; and thermoplastic films provided on both sides of said combination of the sheet member and the electrodes and located on the inner side of said polyester films, respectively, for being heat-sealed to these polyester films, respectively, said impregnated web carrying said electrodes thereon, said polyester films and said thermoplastic films being bonded together in laminated form by being heat-pressed by relaying on platen heat-sealing technique into an integral body. This sheet assembly is of a superior water-proofness and electric insulating ability and is desirably thin and flexible. Thus, it has many use in the industrial fields.

10 Claims, 8 Drawing Figures

ELECTRIC HEAT-GENERATING SHEET ASSEMBLY

BACKGROUND OF THE INVENTION

1. Field of the Invention

The present invention is concerned with an electric heat-generating sheet assembly, and more particular, it relates to an electric heat-generating sheet assembly containing therein an electrically resistive, porous, flexible web made mainly of carbon fibers and non-meltable fibers.

2. Description of the Prior Art

A paper-like, porous and flexible electrically resistive web comprising carbon fibers and non-meltable fibers is known, for example from what is disclosed in the specification of British Pat. No. 110,792. However, a problem lies in that it has been difficult to obtain the known electrically resistive web having a constant and stable resistance value. In order to improve this defective of the prior art, I invented an electric heating device of sheet type having good electric insulation and a constant and stable resistance value by laminating, on an electrically resistive web, paper sheets impregnated with a thermosetting resin, and this invention is disclosed in my U.S. Pat. No. 3,657,516 Specification.

Another problem of such a known electrically resistive heat-generating web and also of such a known electric heat-generating sheet assembly as described above is found in the fact that they lack waterproofness and that, accordingly, their use is limited. Waterproofness may be accomplished in general by, for example, enclosing, in sealed fashion, the web member or the sheet assembly in a flexible bag made of rubber or a plastic material as shown in U.S. Pat. No. 3,257,498 Specification. Such a known device, however, is defective in that the heat-generating web member becomes easily damaged since it is freely movable in its wrapping bag; that the temperature of the generated heat is transmitted to the user only at a lowered level because of the mal-heat-transmitting property of the wrapping bag; and further that the connection of the heat-generating member to the power source is mode difficult due to the wrapping bag covering the sheet member.

I, the inventor, attempted to solve these problems by laminating plastic films having excellent waterproofness and electric insulating ability directly onto the heat-generating web member by relying on the platen heat-sealing technique. However, it was found that the plastic materials to which the platen heat-sealing technique can be applied are limited to those thermoplastic materials such as polyethylene, polypropylene, polyvinyl chloride and nylon resin. These materials, however, have a difficulty in that their permissible highest temperature is limited.

SUMMARY OF THE INVENTION

It is, therefore, an object of the present invention to provide an electric heat-generating sheet assembly having excellent waterproofness and electric insulating ability and exhibiting a constant and stable heating function throughout its prolonged service life and being capable of presenting a very high temperature during use while never losing the ability of evenly radiating heat nor the flexibility which are possessed by the constituting paper-like electrically resistive heat-generating web member.

Another object of the present invention is to provide an electric heat-generating sheet assembly of the type described, whose heat-generating web member further has a highly constant and stable electric resistance.

Still another object of the present invention is to provide an electric heat-generating sheet assembly of the type described, which can be laminated and shaped easily and at a low cost by relying on the known platen heat-sealing technique.

These and other objects as well as the features and advantages of the present invention will become apparent by reading the following detailed statement when taken in conjunction with the accompanying drawings.

DETAILED DESCRIPTION OF THE PREFERRED EMBODIMENTS

An electric heat-generating sheet assembly according to the present invention comprises: A heat-generating paper-like porous and flexible sheet member which is made of a non-woven web formed with electrically resistive carbon fibers and non-meltable fibers, said web being impregnated with a thermosetting plastic resin; at least one pair of electrodes spaced from each other and arranged on the heating member in contact therewith; polyester films sandwiching thereinside the heat-generating sheet member and the electrodes; and thermoplastic films interposed between the polyester films and the electrodes and the heat-generating sheet member so as to heat-seal these members. These component members are laminated and then molded by heat-sealing into an integral body.

Figure 1:
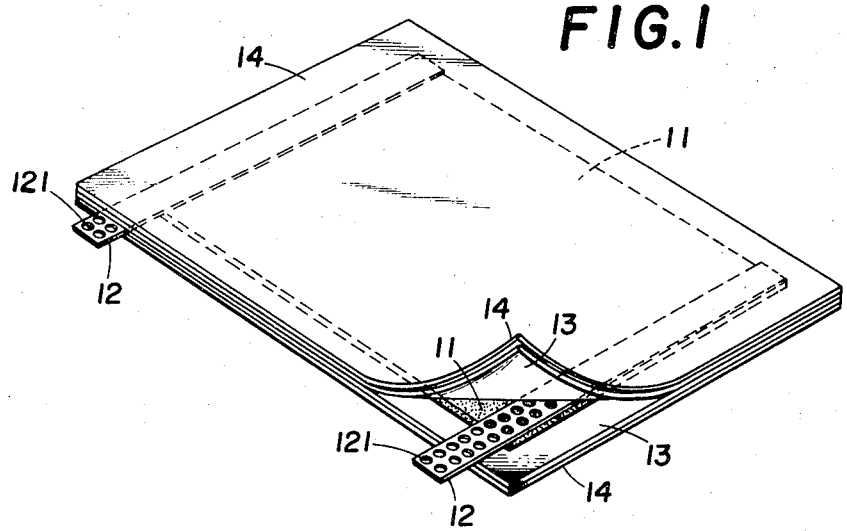
FIG. 1 is a perspective view, with a part peeled off, showing an embodiment of the present invention.
Figure 2:
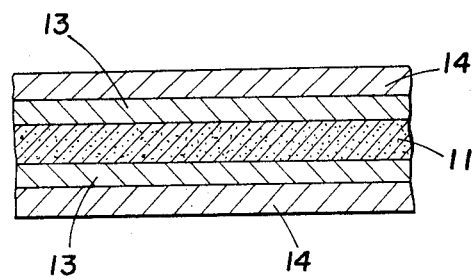
FIG. 2 is a fragmentary vertical sectional view, showing a model arrangement of an electric heat-generating sheet assembly embodying the present invention.

In FIGS. 1 and 2, the heat-generating sheet member is designated at 11, the electrodes at 12, the thermoplastic films at 13, and the polyester films at 14.

The heating member 11 is comprised of porous, flexible electrically resistive web which is made by the use of mainly a mixture of carbon fibers and non-meltable fibers, with or without a plastic binder and/or a white pigment as required and by shaping said mixture into a paper or felt form by known paper manufacturing techniques. The carbon fibers employed in the present invention are desirably 7 – 12 microns in diameter and 0.5 – 20mm in length. The mixing ratio of the carbon fibers to be contained in said electrically resistive web having the non-meltable fiber therein is desirably at least 40 percent by weight. The non-meltable fibers employed in said electrically resistive web may be made of inorganic fibers such as glass fibers or asbestos fibers, or organic fibers such as cellulose fibers or plastic fibers.

It should be noted that such an electrically resistive heat-generating web as described above is known, but that according to the present invention, this web further is impregnated directly with a thermosetting plastic material to form the heat-generating sheet member of the present invention. The thermosetting plastic materials which can be used to impregnate the electrically resistive web are, for example, benzo-guanamine resins, epoxy resins, melamine resins and phenolic resins. After many and various experiments and tests, however, diarylphthalate resins were found most desirable from the aspects of resistivity to heat and of electric insulating ability. Such a thermosetting plastic when used for the impregnation of the electrically resistive web filtrates into the spaces between the carbon fibers contained in this sheet member and sets thereat and thus fixes the carbon fibers, at the time of lamination-molding by heat-pressing thereby contributing in making the sheet member having a constant and stable electric resistance. Since, according to the present invention, the carbon fibers are mixed in the electrically resistive heat-generating web at as high a mixing ratio as 40% by weight, almost all of the carbon fibers are entangled with each other at least at a portion thereof. At the time of laminating, by heat-pressing, the electrodes by relying on the platen heat-sealing technique, these entanglements between the carbon fibers serve to fix the thermosetting plastic material with which the fibers are impregnated. For this reason, the electrically resistive heat-generating sheet member of the present invention can have a highly constant and stable electric resistance. This mode of function is intensified furthermore during subsequent laminating and molding operation step which is given to the plastic films by relying on the platen heat-sealing technique.

The electrodes which are to be arranged in spaced relation with each other on the heat-generating sheet member 11 are placed directly on this sheet member for establishing electric connection with the heat-generating sheet member. The electrodes are each made of metal foil having numerous perforations 121 formed throughout thereof. When these electrodes are placed in position directly on the heat-generating sheet member impregrated with a thermosetting plastic material and when the electrodes are heat-pressed to the sheet member by platen heat-sealing technique, this plastic material enters into the perforations, with the result that the electrodes are positively secured to the heat-generating sheet member. This fixing of the electrodes permits the subsequent step of laminating plastic films onto the resulting sheet member to be performed without causing any displacement in position of the electrodes. Not only that, but also the thermoplastic films are caused to infiltrate into the perforations at the time of molding. Accordingly, it will be understood that, in case the end portions of the electrodes are extended beyond the edges of the heat-generating sheet member, the laminated thermoplastic films are also capable of establishing a perfect seal around each electrode. Furthermore, the contact of the electrodes with the heat-generating sheet member is improved, so that the electric resistance between this sheet member and the electrodes is minimized. Thus, it is possible to decrease the breadth of each electrode to suit the design.

Each of these electrodes is provided with lead wires and terminals though not shown that the electrodes can be connected to a power source. The electrodes are made of metal foil in order to minimize the thickness of the heat-generating sheet member. It is needless to say that metal tapes or metal wires can be employed as required.

Two kinds of plastic films 13 and 14 for sandwiching the heat-generating sheet member 11 carrying spaced electrodes 12 are made with a thermoplastic material and a polyester material, respectively. The films 13 may be made of such a material as polyethylene, polypropyrene, polyvinyl chloride and nylon. In this example, polyethylene is used. On the other hand, the film 14 is made of a drawn and oriented polyester material. These two kinds of films are laminated to each other before being laminated further onto the heat-generating sheet member 11 in order to facilitate this latter lamination. Accordingly, there are obtained two sets of laminated films each consisting of films 13 and 14. These laminated films are given a size sufficient for covering the entire area of the heat-generating sheet member. These laminated films are laminated and pressed onto the heat-generating sheet member 11 at both sides thereof to be sealed thereto by means of platen heat-sealing technique in such a way that the thermoplastic films 13 and 13 lie proximal to the sheet member 11 to be in direct contact with this sheet member 11. Thus, the electrode-carrying sheet member 11 is in the form of being sandwiched between two sets of laminated films 13 and 14. As a result, both the heat-generating sheet member 11 and the electrodes 12 carried thereon are enclosed within the plastic films 13 and 14, providing an integral assembly. According to the present invention, therefore, there is obtained an electric heat-generating sheet assembly having a stable and constant electric resistance value, and having a superior waterproofness, and having a small thickness and being flexible. In addition thereto, the sheet assembly is of a very high electric insulating ability.

Next, description will be made on an example of the electric heat-generating sheet assembly of the present invention and on its maximum destructive voltage value, electric insulation resistance value, electric insulation resistance value in water and the result of test on the temperature coefficient of this sheet assembly.

The carbon fibers employed in the electric heat-generating sheet member have the following physical property.

| | |
|---|---|
| Diameter | 7 – 12 microns |
| Length | 0.5 – 20 millimeters |
| Tensile strength | 12 tons/sq. cm. |
| Prolongation | 1.5% |
| Elasticity | 800 tons/sq. cm. |
| Specific electric resistance | $(5-8) \times 10^{-3}$ ohm cm. |
| Expansion | $1.7 \times 10^{-6}$/temperature (Centigrade) |
| Heat-resistivity (in nitrogen-containing atmosphere) | 2000°C |
| Purity | 99.8% |

The electrically resistive web has the following physical property.

| | |
|---|---|
| Non-meltable fibers | Pulp |
| Mixing ratio of carbon fibers and non-meltable fibers (percent per weight) | 40 : 60 |
| Binder (synthetic resin) | Trifling amount |
| Thickness | 0.22 millimeter |
| Weight (gram) per sq. meter | 220 – 250 |

-Continued

| Electric resistance value (sheet of 200 mm square having electrodes at opposite ends) | 12 ohms |
|---|---|

The heat-generating sheet member is 200 × 200 mm in size and has an average electric resistance value of 12 ohms and is arranged so that the variance of the resistance value lies within ± 0.6 ohm throughout the sheet portions. The plastic films laminated on this heat-generating sheet member are a polyethylene film of 40 microns in thickness and a polyester film of 50 microns in thickness, respectively. The heat-generating sheet assembly having laminated films bonded to the heat-generating sheet member by platen heat-sealing technique is arranged so that the variance of its thickness lies within 10 microns.

The test pieces were prepared by cutting out a large sheet of material in order to obtain a precise and correct result of test. In all, 20 pieces of test were prepared. Five test pieces were used for each test. The result of tests was planned to be shown by the average value and by the variance of the respective five pieces.

The maximum destructive voltage test was conducted by the application of current of 6,000 volts between the electrodes and the surface of heat-generating sheet member of the electric heat-generating sheet assembly. This voltage was elevated successively by 1,000 volts at a time. The conducting time in each level of voltage is 60 seconds. The result of this test is shown in Table I.

Table I

| No. of Test Piece | Applied Voltage | | |
|---|---|---|---|
| | 6000 V | 7000 V | 8000 V |
| 1 | Nothing wrong | Destroyed in 40 second | |
| 2 | Nothing wrong | Destroyed in 40 second | |
| 3 | Nothing wrong | Destroyed in 50 second | |
| 4 | Nothing wrong | Destroyed in 55 second | |
| 5 | Nothing wrong | Nothing wrong | Destroyed in 30 second |

The average value of electric resistance of 5 test pieces was $7.6 \times 10^9$ ohms. The difference between the maximum value and the minimum value was $2.5 \times 10^9$ ohms.

The determination of the electric insulation resistance value of the sheet assembly in water was conducted by placing the sheet assembly in a water-containing vessel and placing an independent electrode into the water of the vessel in spaced relation from those electrodes of the sheet assembly and by applying a voltage between one of the electrodes of the sheet assembly and said independent electrode which both extend beyond the surface of water contained in the vessel, and by seeking the electric insulation resistance value between them. In order to render the sheet assembly to a state quite close to the state of being used actually, the applied voltage was regulated so that the electric heat-generating sheet assembly would have a constant surface temperature of 80°C. Also, in order to keep the unstableness of function of this heat-generating sheet assembly which might take place immediately after its being fabricated from being introduced into the measured value, the sheet assembly was subjected to application of electric current for one hour in air for the sake of aging, before being placed in water. The result of the "in-water" test is as shown in Table II. The unit of the values is ohm.

Table II

| | 1 hr. In Air | In Water | | | | |
|---|---|---|---|---|---|---|
| | | 24 hrs. | 100 hrs. | 300 hrs. | 500 hrs. | 1000 hrs. |
| Average electric insulation resistance value | $5.3 \times 10^9$ | $6.1 \times 10^9$ | $5.1 \times 10^9$ | $7.1 \times 10^9$ | $6.5 \times 10^9$ | $5.8 \times 10^9$ |
| Variance | $1.9 \times 10^9$ | $1.4 \times 10^9$ | $1.8 \times 10^9$ | $2.1 \times 10^9$ | $1.6 \times 10^9$ | $1.7 \times 10^9$ |

The average temperature coefficient was 0.00015/°C, and its variance was 0.00002/°C.

These results of tests expressly show that the electric heat-generating sheet assembly according to the present invention possesses a more-than-sufficient ability. What should be noted in particular is the fact that the electric insulation resistance value of the sheet assembly when placed in water exceeds the value in air, though slightly.

Figure 3:
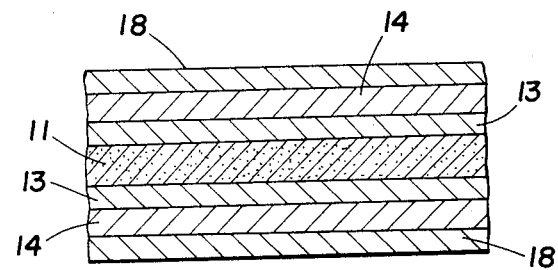
FIG. 3 is a fragmentary vertical sectional view, showing a model arrangement of another embodiment of the present invention.

These electric heat-generating sheets themselves can be used for an anti-coldness cover for the curing of concrete at severely cold sites. Also, as shown in FIG. 3, the heat-generating sheet member 11 on which are carried the electrodes 12 may be sandwiched by three layers of films, in which case the outermost layers 18 and 18 each consists of a thermoplastic material such as polyethylene and polypropylene. By doing so, these films 18 and 18 will facilitate a further lamination onto some other material.

The electric heat-generating sheet assemblies having undergone such secondary processing as described above are shown in FIGS. 4 through 8.

Figure 4:
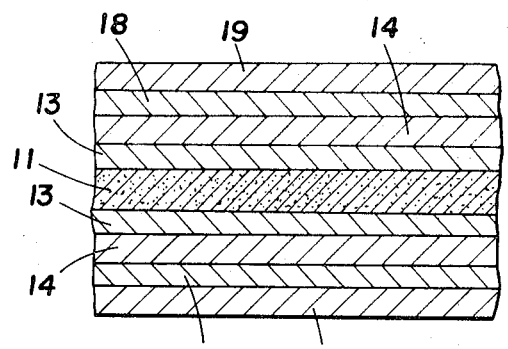
FIGS. 4 through 8 are fragmentary vertical sectional views, showing model arrangements of further embodiments of the present invention, respectively.

FIG. 4 shows a sheet assembly which is most suitable for surface heating such as in heating at wall surfaces. A core structure which is constructed by a heat-generating sheet member 11, electrodes 12, 12 polyethylene films 13, 13, polyester films 14, 14 and polyethylene films 18, 18 is sandwiched further between sheets 19, 19 of decorative nature which are laminated to the outermost films by platen heat-sealing technique to form an integral sheet assembly.

Figure 5:
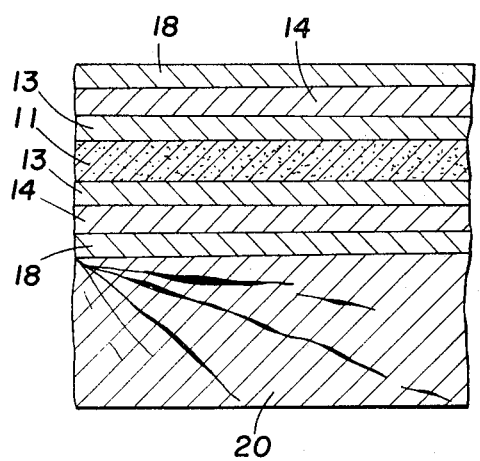

FIG. 5 shows an electric heat-generating unit intended for floor heating. This unit is composed of said core structure and having a plywood board 20 bonded to one of the outermost polyethylene films 18 and 18 by platen heat-sealing technique. Though not shown, a heat-insulating sheet material may be laminated onto the other one of the outermost polyethylene films 18 and 18 which is located on the other side of the sheet assembly.

Figure 6:
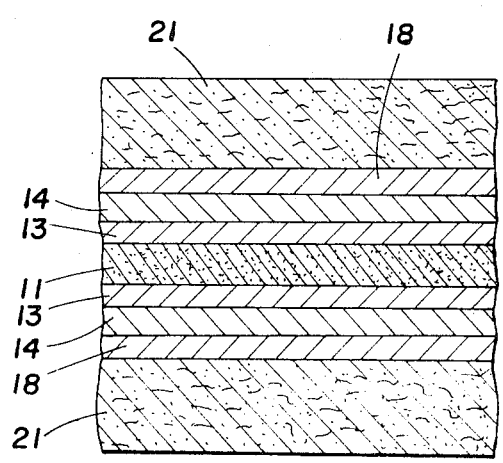

FIG. 6 shows an electric heat-generating sheet assembly for heating an article having an uneven surface. This sheet assembly is such that said core is sandwiched between glass fiber mats 21 and 21 and bonded to these mats by platen heat-sealing technique.

Figure 7:
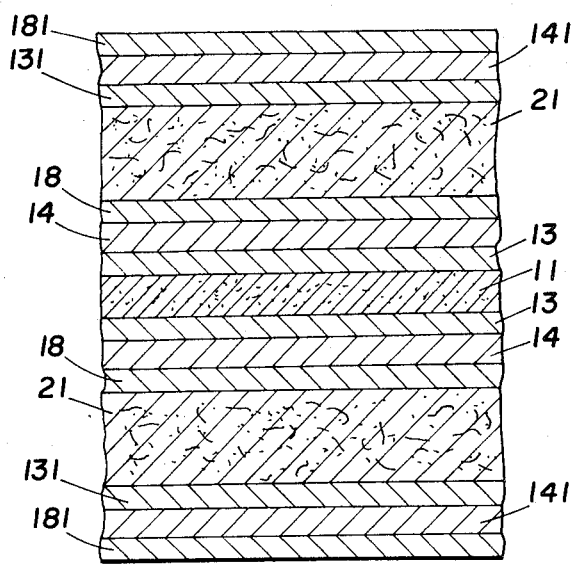

FIG. 7 shows an instance wherein two film structures each being prepared beforehand by laminating a polyethylene film 131, a polyester film 141 and a polyethylene film 181 to each other are bonded to the glass fiber mats 21 and 21 of the electric heat-generating sheet assembly shown in FIG. 6, respectively, by platen heat-sealing technique. The outermost polyethylene films 181 and 181 will facilitate the whole assembly to be laminated further to some other materials. In addition thereto, the glass fiber mats 21 and 21 give an appropriate cushioning effect.

Figure 8:
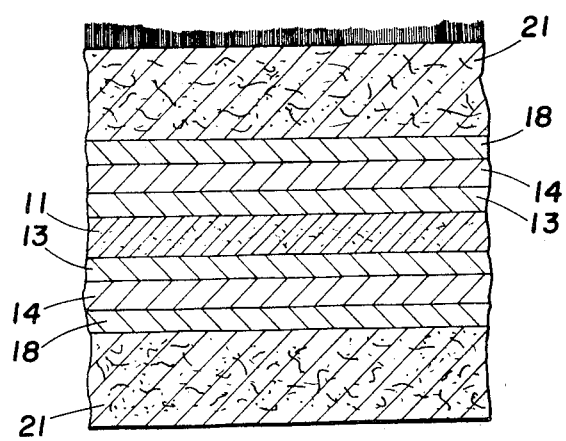

FIG. 8 shows an instance wherein a rug-like heater is prepared. The surface of one of the glass fiber mats 21 and 21 of the electric heat-generating sheet assembly shown in FIG. 7 is given or implanted with wooly piles or the like.

I claim:

1. An electric heat-generating sheet assembly, comprising:
   an electric heat-generating sheet member made of a porous, paper-like web consisting of carbon fibers and non-meltable fibers and being impregnated with a thermosetting plastic material,
   at least one pair of electrodes arranged, in spaced relation from each other, on said sheet member in contact with its surface,
   polyester films sandwiching the combination of said electrodes and said sheet member, and said sheet member, and
   thermoplastic films provided on both sides of said combination of the sheet member and the electrodes and located on the inner side of said polyester films, respectively, for being heat-sealed to these polyester films, respectively, said sheet member impregnated with a said thermosetting plastic material and carrying said electrodes thereon, said polyester films, and said thermoplastic films being bonded together in laminated form by being heatpressed by relying on platen heat-sealing technique into an integral body.

2. An electric heat-generating sheet assembly according to claim 1, in which said web contains at least 40 weight percent of carbon fibers having a diameter of 7 – 12 microns and a length of 0.5 – 20 mm and also contains 1 – 60 weight percent of non-meltable fibers.

3. An electric heat-generating sheet assembly according to claim 2, in which said thermally non-meltable fibers are pulp.

4. An electric heat-generating sheet assembly according to claim 1, in which said thermosetting plastic material for impregnating the web is diarylphthalate.

5. An electric heat-generating sheet assembly according to claim 1, in which said electrodes each has numerous perforations at least at the portion contacting said sheet member.

6. An electric heat-generating sheet assembly according to claim 1, in which said thermoplastic films are polyethylene films.

7. An electric heat-generating sheet assembly according to claim 1, in which a further thermoplastic film is laminated on at least one of said polyester films.

8. An electric heat-generating sheet assembly according to claim 7, in which a glass fiber mat is further laminated on said further laminated thermoplastic film.

9. An electric heat-generating sheet assembly according to claim 8, in which a thermoplastic film is further laminated on said glass fiber mat.

10. An electric heat-generating sheet assembly according to claim 8, in which the outer surface of said glass fiber mat is given a wooly-pile-implanting treatment.

* * * * *